US007602511B2

(12) United States Patent
Kojima et al.

(10) Patent No.: US 7,602,511 B2
(45) Date of Patent: Oct. 13, 2009

(54) TRANSMISSION DEVICE ENABLING EXTERNAL DEVICE TO EDIT ADDRESS DATA REGISTERED IN THE TRANSMISSION DEVICE

(75) Inventors: Atsushi Kojima, Kasugai (JP); Hideto Matsumoto, Nagoya (JP); Hideki Nogawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1122 days.

(21) Appl. No.: 10/223,605

(22) Filed: Aug. 20, 2002

(65) Prior Publication Data

US 2003/0035150 A1 Feb. 20, 2003

(30) Foreign Application Priority Data

Aug. 20, 2001 (JP) .............................. 2001-248904

(51) Int. Cl.
G06F 3/12 (2006.01)
(52) U.S. Cl. ...................... 358/1.15; 358/440; 358/402; 358/407; 358/255; 370/255
(58) Field of Classification Search ................ 358/1.15, 358/440, 402, 407, 255; 370/255
See application file for complete search history.

(56) References Cited

U.S. PATENT DOCUMENTS

| 5,995,240 | A | * | 11/1999 | Sato ............................ 358/407 |
| 6,208,426 | B1 | * | 3/2001 | Saito et al. .................. 358/1.15 |
| 6,314,476 | B1 | | 11/2001 | Ohara |
| 6,442,144 | B1 | * | 8/2002 | Hansen et al. ............... 370/255 |
| 6,707,580 | B1 | * | 3/2004 | Bloomfield .................. 358/402 |
| 6,882,450 | B1 | * | 4/2005 | Baba .......................... 358/442 |
| 6,963,427 | B1 | | 11/2005 | Tanimoto |
| 2006/0155825 | A1 | | 7/2006 | Torii |

FOREIGN PATENT DOCUMENTS

| JP | A-4-035259 | 2/1992 |
| JP | A-4-312067 | 11/1992 |
| JP | A-11-205516 | 7/1999 |
| JP | A-11-252119 | 9/1999 |
| JP | A-11-313078 | 11/1999 |
| JP | A-11-355497 | 12/1999 |
| JP | A-2000-066978 | 3/2000 |
| JP | A-2000-069010 | 3/2000 |
| JP | A-2000-134203 | 5/2000 |
| JP | A-2000-196771 | 7/2000 |
| JP | A-2000-200231 | 7/2000 |
| JP | A-2000-339247 | 12/2000 |
| JP | A-2000-357138 | 12/2000 |
| JP | A-2001-036631 | 2/2001 |
| JP | A-2001-251340 | 9/2001 |

* cited by examiner

Primary Examiner—Twyler L. Haskins
Assistant Examiner—Michael Burleson
(74) Attorney, Agent, or Firm—Oliff & Berridge, PLC

(57) ABSTRACT

A facsimile device 10 serving as a transmission device of the present invention has a maintenance information base (MIB) 23a storing address data. When the facsimile device 10 receives a SNMP-based packet including a GET command, the address data is retrieved and transmitted to an external device 3. When the facsimile device 10 receives a SNMP-based packet including a SET command, address data included in the packet is retrieved and registered into the MIB 23a.

11 Claims, 5 Drawing Sheets

TRANSMISSION DEVICE ENABLING EXTERNAL DEVICE TO EDIT ADDRESS DATA REGISTERED IN THE TRANSMISSION DEVICE

BACKGROUND OF THE INVENTION

1. Field of the Invention

The present invention relates to a transmission device that performs transmission with a remote device over a wide area network based on address data.

2. Related Art

There have been known facsimile machines as transmission devices that retrieve image data from documents using a scanner function and that transit the image data to remote devices over a public telephone network.

Generally, facsimile machines are capable of registering address data, such as telephone numbers of remote facsimile machines to which image data is transmitted. If a user pre-registers textual information in the facsimile machine in association with each often-used facsimile numbers, then the user can transmit image data to a desired remote facsimile machine by merely operating an operation panel while viewing the textual information displayed on an LCD, for example, without remembering the facsimile number of the remote facsimile machine.

Recently, multifunction facsimile machines have become very popular. Multifunction facsimile machines have a variety of functions, including a copy function, a printer function, and a transmission function.

Because multifunction facsimile machines are mainly used in business situations, multifunction facsimile machines are provided with an internal LAN card, for example, to enable connection to a local area network (LAN). This enables users to confirm the operation condition of the multifunction facsimile machine from any personal computers connected to the LAN and also enables users to transmit data stored in the personal computers to a remote device via a facsimile transmission.

This type of multifunction facsimile machine often includes a function enabling a user to edit address data stored in the facsimile machine using a personal computer connected to the LAN. If the personal computer is installed with special software for editing the address data in the facsimile machine, then the user can edit address data stored in the facsimile machine using the personal computer.

SUMMARY OF THE INVENTION

However, different types of multifunction facsimile machines use different formats for storing address data. Therefore, different special software is required for different types of facsimile machine. If different types of facsimile machines are connected to a single LAN, then a user needs to install the required different types of special software in each personal computer in order to edit address data in all of the facsimile machines. Also, each time the user faxes image data from a personal computer, the user must decide which special software is appropriate for the facsimile machine to be used. Moreover, address data registered in a facsimile machine cannot be registered, by merely transmitting the address data to another facsimile machine, for example, into the another facsimile machine that uses a different data storage format.

In order to overcome the above-described problems, it is conceivable to design a single software package that can be used for any data storage formats by integrating all the software programs. However, designing such a software package would be extremely troublesome because, for example, a software designer would have to write programs for different storage formats and programs for converting address data between different data storage formats.

It is also conceivable to design all different types of facsimile machine to use the same data storage format. Then, the program design would be much simpler. However, in this case also, special software must be developed from scratch for the data storage format.

It is an objective of the present invention to overcome the above-described problems and to provide an address management device capable of editing address data registered in a transmission device from a remote location using a simple and inexpensive configuration, and a transmission device enabling the address management device to edit the address data registered in the transmission device from a remote location using a simple and inexpensive configuration.

In order to achieve the above and other object, there is provided a communication device including a memory that stores address data relating to remote devices, a retrieving unit that retrieves address data from the memory based on a remote-device indication information, a communication unit that communicates the remote devices based on the retrieved address data, and a data editing unit that communicates with an address management device. The data editing unit edits the address data stored in the memory based on SNMP-based communication with the address management device.

There is also provided an address management device including an address data registration unit that communicates with a communication device. The address data registration unit transmits, based on SNMP, a register command and address data to the communication device when transmission of the address data is instructed by a user.

There is also provided an address management device including an address data retrieving unit that communicates with a communication device and that retrieves address data from the communication device by transmitting a retrieve command to the communication device based on SNMP when retrieve of the address data is instructed by a user, and a display that displays the address data retrieved from the communication device.

Further, there is provided a control program for controlling an address management device. The control program includes the programs of transmitting a register command and address data based on SNMP to one or more of communication devices when transmission of the address data is instructed by a user.

Still further, there is provided a control program for controlling an address management device. The control program includes the programs of transmitting a retrieve command to a communication device based on SNMP when retrieve of address data is instructed by a user, retrieving address data from the communication device, and displaying the address data retrieved from the communication device.

Moreover, there is provided a program storing medium that stores a control program for controlling an address management device. The control program includes the programs of transmitting a register command and address data based on SNMP to one or more of communication devices when transmission of the address data is instructed by a user.

There is also provided a program storing medium that stores a control program for controlling an address management device. The control program includes the programs of transmitting a retrieve command to a communication device based on SNMP when retrieve of address data is instructed by a user, retrieving address data from the communication device, and displaying the address data retrieved from the communication device.

PREFERRED EMBODIMENT OF THE PRESENT INVENTION

Next, a transmission system including a communication device and an address management device according to an embodiment of the present invention will be described while referring to the attached drawings.

Figure 1A:
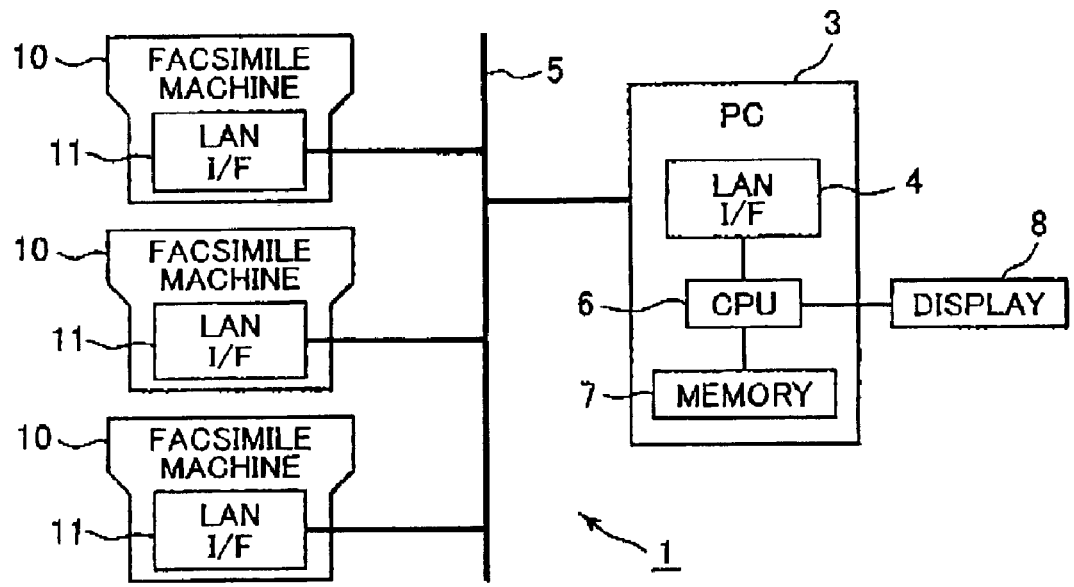
FIG. 1(a) is a block diagram showing a transmission system with a personal computer and facsimile machines according to an embodiment of the present invention.

As shown in FIG. 1(a), a transmission system 1 configures a single LAN including facsimile machines 10 and an external device 3 connected by a local area network (LAN) cable 5. The facsimile machines 10 serves as communication devices of the present invention. The external device 3 is a personal computer, for example, and serves an the address management device of the present invention. As shown in FIG. 1(a), the external device 3 includes a LAN interface 4 connected to the LAN cable 5, a CPU 6, and a memory 7. A display 8 is connected to the external device 3.

Here, variety of transmission configurations can be used, such as serial, parallel, Universal Serial Bus (USB), and Bluetooth, and the LAN could be a wired or wireless LAN.

Each of the facsimile machines 10 includes a facsimile function, a copy function, and a printer function. The facsimile function is for transmitting image data to an external facsimile machine across a public telephone network. The copy function is for printing out copies of images onto sheets of paper. The printer function is for printing out, onto sheets of paper, image data transmitted from the external device 3 across the LAN cable 5.

Figure 1B:
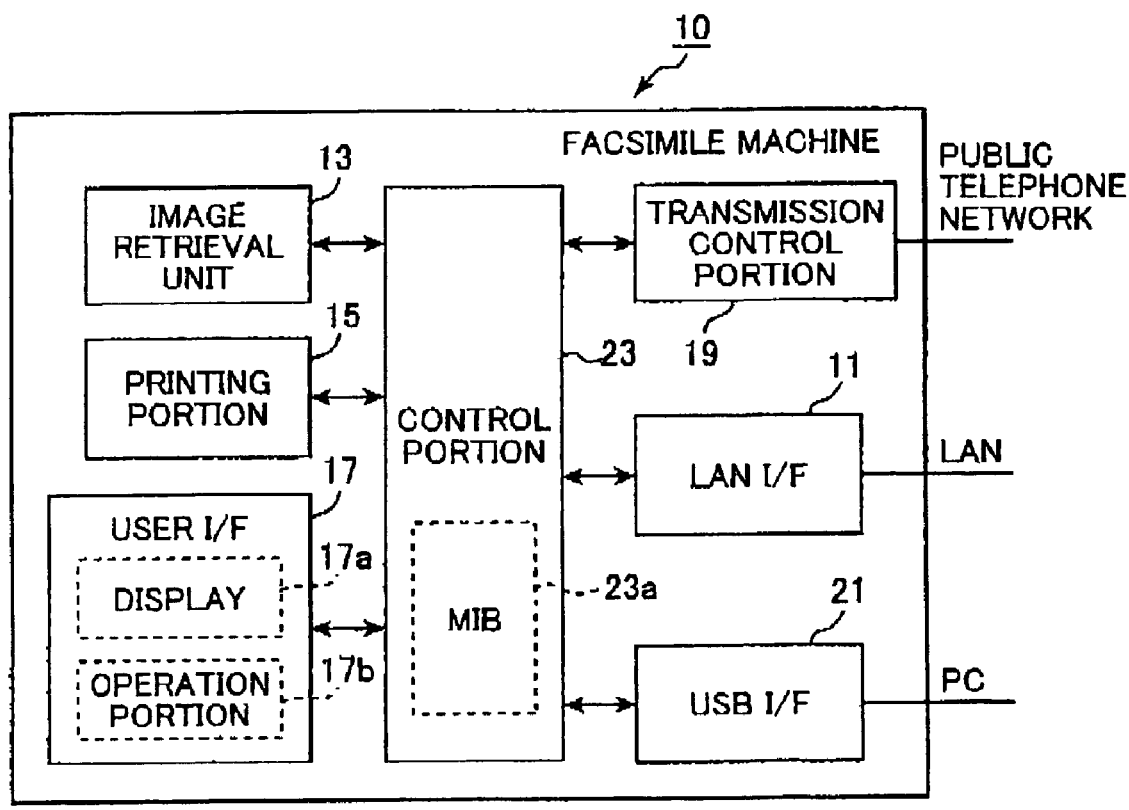
FIG. 1(b) is a block diagram showing one of the facsimile machines of FIG. 1(a)

As shown in FIG. 1(b), each facsimile machine 10 includes a LAN interface 11, an image retrieval unit 13, a printing portion 15, a user interface 17, a transmission control portion 19, a Universal Serial Bus (USB) interface 21, and a control portion 23. The transmission control portion 19 is connected to the public telephone network.

The image retrieval unit 13 functions as a scanner when the facsimile function or the copy function of the facsimile machine 10 is used. The image retrieval unit 13 retrieves images, such as characters or drawings, by irradiating light onto an original document, converts the retrieved images into image data, and sends the image data to the control portion 23. The image retrieval unit 13 includes a sheet feed mechanism, enabling the image retrieval unit 13 to retrieve images consecutively from a plurality of documents.

The printing portion 15 is for printing out image data retrieved by the image retrieval unit 13 or transmitted from a remote facsimile machine over the public telephone network. The printing portion 15 can perform photographic printing. Although not shown in the drawings, the printing portion 15 includes a sheet supply mechanism, a sheet feed mechanism, and a sheet discharge mechanism. The sheet teed mechanism enables the printing portion 15 to print out image data consecutively on sheets of paper.

The user interface 17 includes a display 17a, such as a liquid crystal display, and an operation portion 17b including key switches. The user manipulates the operation portion 17b to input various commands to the control portion 23, and the display 17a displays information transmitted from the control portion 23 and the like.

Examples of information displayed on the display 17a includes textual information about the operating condition or settings of the facsimile machine 10, address data indicating facsimile numbers or names of targets to which image data is to be transmitted, and the like.

The transmission control portion 19 is for connecting the facsimile machine 10 to the public telephone network. For example, based on input signals from the control portion 23, the transmission control portion 19 connects the facsimile machine 10 through the public telephone network to a remote facsimile machine, which is the target of image data transmission, and transmits image data retrieved by the image retrieval unit 13 to the remote facsimile machine as transmission data.

The LAN interface 11 is for connecting the facsimile machine 10 to the LAN and is capable of performing two-way transmission with the external device 3 and the like across the LAN. The LAN interface 11 uses a TCP/IP, IPX/SPX or other transmission format to, for example, obtain image data from the external device 3, input the image data into the control portion 23, and, based on commands from the control portion 23, notify an external device about the operating condition of the facsimile machine 10.

The LAN interface 11 is capable of communicating with the external device 3 based on a well-known simple network management protocol (SNMP). As will be described later, the LAN interface 11 uses SNMP to perform transmission with the external device 3 or other external address management device and to operate address data stored in the control portion 23 based on commands from the external device 3.

When connected to an external device, such as a personal computer, the USB interface 21 is capable of retrieving image data from the external device. Although the USB interface 21 is basically used for the same purposes as the LAN interface 11, the USB interface 21 is used also for connecting the facsimile machine 10 to a personal computer and other devices that cannot be connected to the LAN.

The control portion 23 is for controlling overall operations in the facsimile machine 10. The control portion 23 includes a central processing unit (CPU), a memory, and other components not shown in the drawings. The control portion 23 further includes an SNMP-based management information base (MIB) 23a stored in the memory. The configuration of the MIB 23a is well known in the art.

Figures 2A, 2B, 2C:
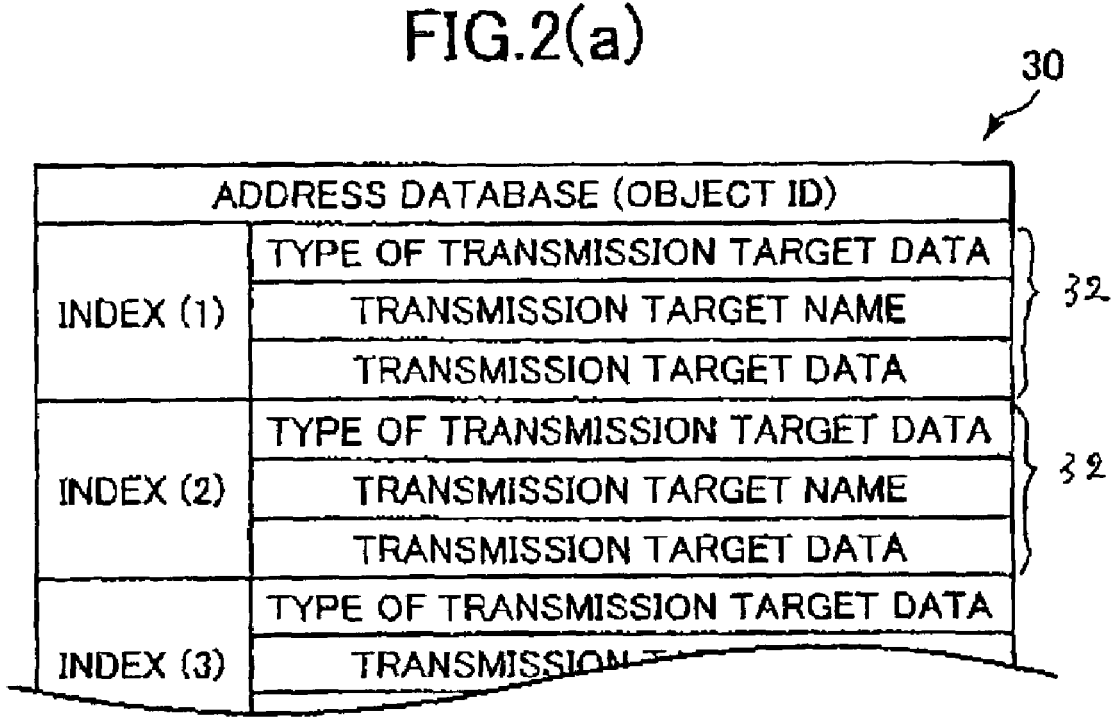
FIG. 2(a) is a schematic view of a management information base stored in the facsimile machines of FIG. 1(a)
FIG. 2(b) is a schematic view showing configuration of a SNMP-based packet transmitted from the personal computer to the facsimile machines.
FIG. 2(c) is a schematic view showing configuration of a SNMP-based packet transmitted from the personal computer to the facsimile machines.

The MIB 23a stores a plurality of objects, one of which configures an address database (DB) 30 shown in FIG. 2(a). As shown in FIG. 2(a), each of objects, including the address database 30, is provided with an object identification (OID), which is allotted in a tree configuration starting with the router, for distinguishing it from other objects. The address database 30 includes a plurality of subordinate objects 32, each is assigned with an object identification configured with the object identification (OID) of the address database 30 and corresponding index number.

The subordinate objects 32 are for storing address data including a data type of transmission target data, a transmission target name, and transmission target data.

In the present embodiment, the data type of transmission target data is indicated by single-byte data for "01" or "02", wherein "01" represents a telephone number, and "02" represents an e-mail address.

The transmission target name is character information (32 bytes of data in the present embodiment) for displaying the name of the transmission target, such as a person or a company, on the display 17a.

The transmission target data is 32-byte data representing character information for a telephone number or an e-mail address of the transmission target. The transmission target data is used when transmitting image data and the like to a remote device, such as a facsimile device or a personal computer, over the transmission control portion 19 or the LAN interface 11.

The facsimile machine 10 further includes an e-mail function for transmitting mail messages across the LAN interface 11 to a remote device connected to the Internet or to the LAN The e-mail addresses stored as address data (transmission target data) are used for this purpose For example, the facsimile machine 10 can append image data retrieved by the image retrieval unit 13 to an e-mail message and transmit the e-mail message to a remote device.

Figure 3:
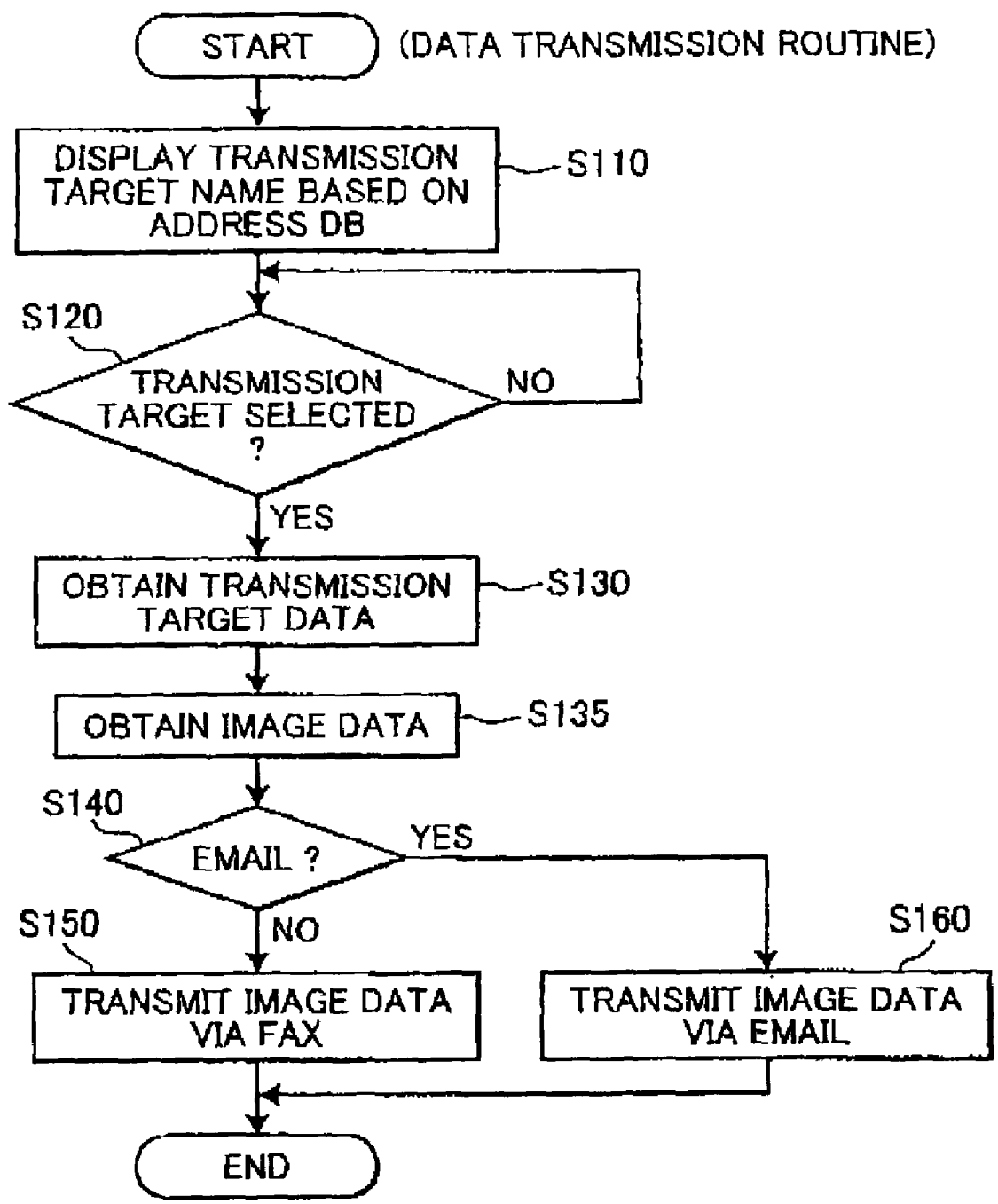
FIG. 3 is a flowchart representing a data transmission routine executed by a control portion of the facsimile machines.

Next, a data transmission process executed by the control portion 23 will be described while referring to the flowchart of FIG. 3. The data transmission process is for retrieving address data from the MIB 23a and transmitting image data to a remote device based on the retrieved address data. The data transmission process is started when a transmission command is input to start transmission of image data.

Once the process starts, first in S110, the transmission target names stored in the MIB 23a are listed up and displayed. At this time, if the transmission command was input through the user interface 17, then the list of the transmission target names is displayed on the display 17a. On the other hand, when the transmission command was input from the external device 3 over the LAN, then data relating to the list of the transmission target names is transmitted to the external device 3, so that the external device 3 displays the transmission target names on the display 8. This enables the user to select a desired transmission target from the displayed list by operating either the operation portion 17b or the external device 3 while viewing the displayed list.

Next, in S120, it is determined whether or not a transmission target is selected. If so (S120:YES), then the process proceeds to S130. On the other hand, if not (S120:NO), then the process waits until the user selects a desired transmission target.

In S130, transmission target data that corresponds to the selected transmission target is retrieved from the MIB 23a, and in S135, image data is obtained from the image retrieval unit 13 or from the external device 3 over the LAN interface 11. Then, in S140 it is determined whether or not the transmission target data is e-mail address by referring to the corresponding data type of transmission target data. If the transmission target data is not an e-mail address (S140:NO), then in S150 the image data is transmitted as a facsimile message over the transmission control portion 19 to the selected transmission target. Then, the routine is ended.

On the other hand, if it is determined in S140 that the transmission target data is an e-mail address (S140:YES), then in S160 the image data is appended to an e-mail message, and the e-male message is transmitted. Then, the routine is ended.

Figure 4:
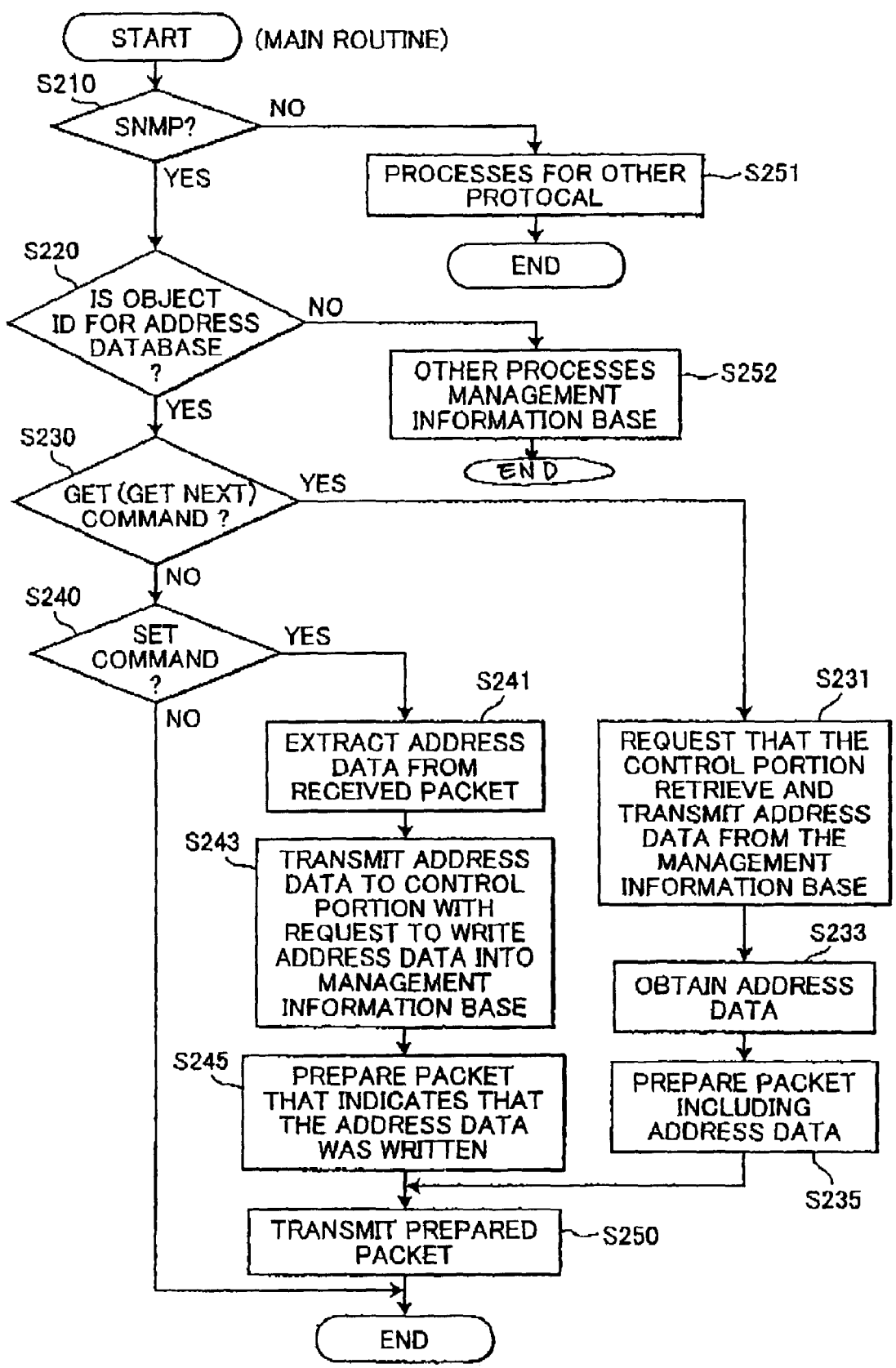
FIG. 4 is a flowchart representing a main routine executed by a LAN interface of the facsimile machines.
Figure 5A:
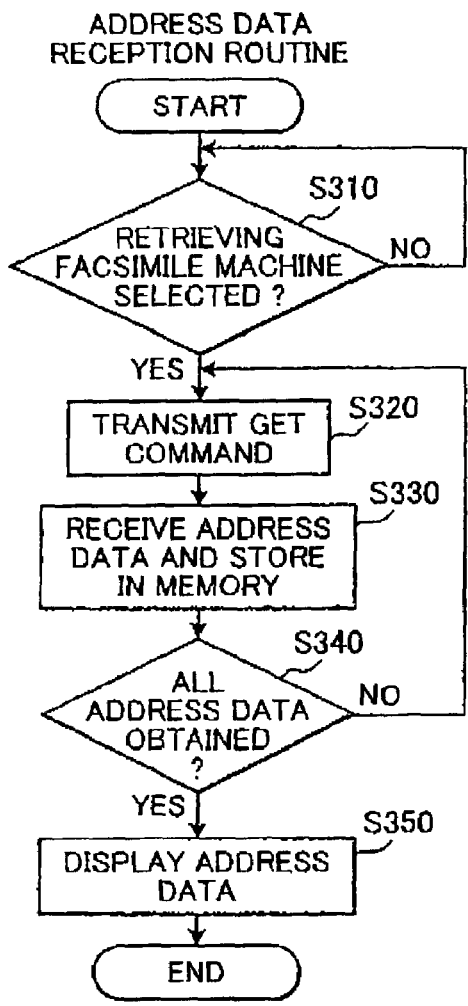
FIG. 5(a) is a flowchart representing an address data reception routine executed by the personal computer.
Figure 5B:
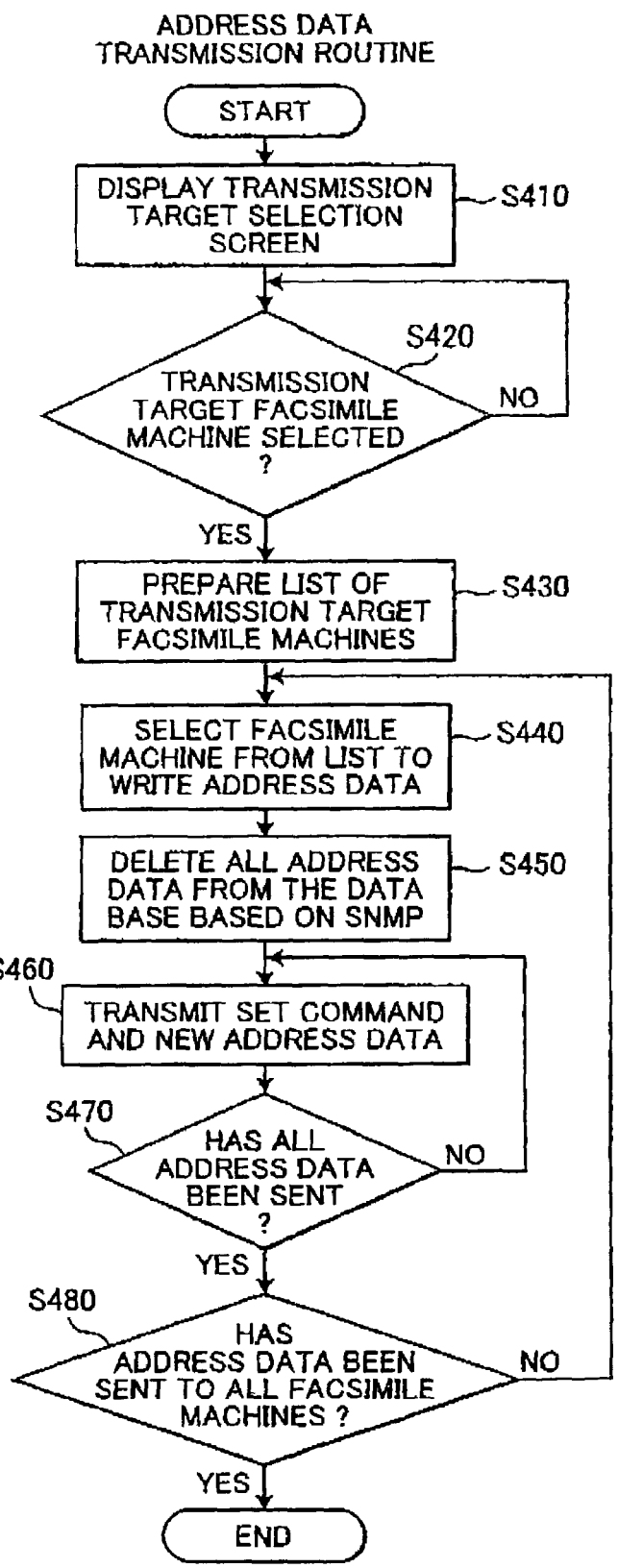
FIG. 5(b) is a flowchart representing an address data transmission routine executed by the personal computer.

Next, the method for editing the address data using the external device 3 will be described while referring to FIGS. 2, 4, and 5. The address data in the SNMP-based MIB 23a is edited by transmitting SNMP-based packets shown in FIGS. 2(b) and 2(c) to the facsimile machine 10 from the external device 3. The packet shown in FIG. 2(b) includes a GET command (or GET NEXT command), the object identification (IOD) of the address database 30, and an index number of a subordinate object 32. The packet shown in FIG. 2(c) includes a SET command, the object identification (OID), an index number, and address data to be registered in the address database 30.

A main routine executed in the LAN interface 11 will be described with reference to the flowchart of FIG. 4. The main routine is for editing the address data and is started when the LAN interface 11 receives a packet from the external device 3. Once the routine starts, first in S210, it is determined whether or not the packet is SNMP based, If not (S210:NO) then the routine proceeds to S251, where other protocols are executed. On the other hand, if the packet is SNMP based (S210:YES), then in S220 it is determined whether or not the object ID (OID) included in the packet is the object ID (OID) of the address database 30.

If not (S220:NO), then the routine proceeds to S252, where processes are executed for another object in the MIB 23a based on data in the packet. On the other hand, if so (S220:YES), it is determined in S230 whether or not the packet includes the GET command (or the GET NEXT command) as shown in FIG. 2(b).

If the packet includes the GET command (or the GET NEXT command) (S230:YES), then in S231 the LAN interface 11 inputs a command to the control portion 23 requesting to retrieve the address data from the subordinate object 32 identified by the index number in the packet from the MIB 23a. As a result, the control portion 23 retrieves the address data and transmits the same to the LAN interface 11. In this manner, the LAN interface 11 obtains the address data from the MIB 23a in S233.

In S235, the LAN interface 11 prepares a SNMP-based packet that includes the address data obtained in S233, and in S250 transmits the packet using TCP/IP protocol across the LAN to the external device 3. Then, the present routine is ended.

On the other hand, if it is determined in S230 that the received packet does not include a GET command (or a GET NEXT command) (S230:NO), then in S240 it is determined whether or not the received packet includes a SET command as shown in FIG. 2(c). If not (S240:NO), then the routine is ended. On the other hand, if so (S240:YES), then in S241 the LAN interface 11 extracts address data from the received packet. In S243, the LAN interface 11 transmits the extracted address data to the control portion 23 and requests the control portion 23 to register the address data into the MIB 23a. In this manner, the address data transmitted in a packet from the external device 3 is registered into the MIB 23a.

In S245, the LAN interface 11 generates a packet that indicates that the address data was successfully registered in the MIB 23a and transmits the prepared packet across the LAN to the external device 3. Afterward, the routine is ended.

Next, an address data reception routine executed in the address management device will be described while referring to the flowchart of FIG. 5(a). In the present example, the address management device is the external device 3.

The address data reception routine is started when a user input a command for obtaining address data. The address data reception routine is executed by the CPU 6 of the external device 3. When the routine is started, first in S310, it is determined whether or not the user has selected one of the facsimile machines 10 from which the user wishes to retrieve address data.

If it is determined in S310 that the user has not selected yet (S310:NO), the process waits until the user selects one. On the other hand, if it is determined that the user has selected one (S310:YES), then in S320, a packet that includes a GET command as shown in FIG. 2(b) is prepared, packaged in a TCP/IP packet, and transmitted to the selected facsimile machine 10. As a result, the facsimile machine 1 executes the above-described processes of S231 to S250 shown in FIG. 4 and thus transmits a prepared packet to the external device 3.

Accordingly, in S330, the external device 3 receives the packet from the facsimile machine 10, and temporarily stores address data included in the received packet in the memory 7.

In S340, it is determined whether or not all address data registered in the object database 30 is received. If not (S340: N0), then the process returns to S320 and repeats the same processes until the all address data is received. If the all address data is received (S340:YES), then in S350 the external device 3 displays the obtained address data on the display 8. In this manner, the external device 3 enables the user to edit the address data using the external device 3. Then, the routine is ended.

Next, an address data transmission routine executed by the CPU 6 of the external device 3 will be described while referring to the flowchart of FIG. 5(c). The address data transmission routine is started when a user input a command for transmitting address data, that the user has edited using the external device 3, from the external device 3 to the facsimile machines 10.

Once the routine is started, first in S410, the display 8 of the external device 3 displays a transmission target selection screen listing up all of the facsimile machines 10 so as to enabling a user to select one or more of the facsimile machines 10 to transmit the edited address data. That is, in the present embodiment, more then one facsimile machine 10 can be selected as transmission targets at the same time.

If it is determined in S420 that one or more of the facsimile machines 10 was selected as the transmission target (S420: YES), then in S430 a list of the selected facsimile machine(s) 10 is prepared, and in S440 a single facsimile machine 10 is selected from the list.

In S450, the external device 3 transmits to the selected facsimile machine 10 a SNMP-based packet that includes a SET command or the like and a command for updating all values of the subordinate objects 32 in the address database 30 to values indicating that no address data is registered. In this manner, all address data in the address database 30 of the selected facsimile machine 10 is deleted.

Afterward, in S460, a packet that includes a SET command and the address data edited by the user is prepared and transmitted to the selected facsimile machine 10. In S470, it is determined whether or not all of the edited address data has been transmitted. If not (S470:NO), then the routine returns to S460. If so (S470:YES), then the routine proceeds to S480.

In S480, it is determined based on the list prepared in S430 whether or not the edited address data has been transmitted to all of the target facsimile machines 10 that have been selected by the user. If not (S480:NO), then the routine returns to S440 to repeat the processes in S440 through S470 for a next facsimile machine 10. On the other hand, if so (S480:YES), then the present routine is ended.

In this manner, a user can, for example, transmit address data, such as telephone numbers, from the external device 3 to the facsimile device 10 in order to register the address data into the facsimile device 10. Also, because address data transmitted from the facsimile device 10 is displayed on the display 8 of the external device 3, the user can confirm the contents of the address data without walking over to the facsimile device 10.

Because the facsimile machines 10 are designed so that their address data can be edited from the external device 3 using SNMP, there is no need for the user to walk over to the facsimile machines 10 and input address data using the operation panel 17b.

Because software for editing SNMP-based address data can be applied for editing address data registered in the facsimile devices 10 of the present invention, a program for editing address data using the external device 30 can be easily prepared without preparing the program from scratch.

Because programs for the address data reception routine and the address data transmission routine are stored in the external device 3, the user can use the external device 3 to manage the address database 30 of all facsimile machines 10 connected to the LAN at once. For example, the user can retrieve address data from a single facsimile device 10 and transmit the address data to all of the facsimile devices 10 connected to the LAN, so that all of the facsimile devices 10 can store the same address database 30.

As described above, according to the present invention, address data registered in a facsimile machine can be edited by SNMP-based communication with an external device connected to the facsimile machine via a LAN. Accordingly, merely installing a simple program for editing address data into the external device can enable the external device to serve as the address management device. An inexpensive system that enables a user to edit address data registered in the facsimile machine using the external device can be provided.

Here, the program for executing the above-described data transmission routine and main routine could be stored in a storing medium, such as a semiconductor memory, a flexible disk, a magnetic optical disk, a CD-ROM, a hard disk, and the like, so that user can use the program with the computer.

Although the present invention was described with reference to a specific embodiment, the present invention is not limited to the embodiment and can be modified in a variety of ways.

For example, the address data can be stored in a memory of the LAN interface 11 (not shown). The communication device of the present invention is not limited to a facsimile machine. The address management device is not limited to a personal computer, but could be any device connected to the communication device through a LAN. More than one address management device could be connected to the LAN.

The embodiment described a facsimile machine 10 that received a packet with a GET command sends all of the address data stored in its address database 30 to the external device 3. However, there is not need for the facsimile machine 10 to send all of its address data to the external device 3. Instead, the facsimile machine 10 could be designed to send only selected address data to the external device 3.

Further, the embodiment described facsimile numbers of facsimile machines and e-mail addresses as examples of address data. However, when the facsimile machine 10 is provided with a telephone function, then telephone numbers can be handled in the same manner as address data described above. In this case, the transmission means of the present invention corresponds to an audio transmission operation using a well-known transceiver.

The embodiment describes image data retrieved from a sheet by the image retrieval unit 13 or obtained from the external device 3 across the LAN as an example of transmission data. However, image data obtained from an external transmission terminal through a public telephone network and the transmission control portion 19 can be handled as transmission data and can be further transferred to another external transmission terminal.

What is claimed is:

1. A communication device for communicating with an address management device that edits address data through a local area network (LAN) and communicating with a remote device connected to a communication network, comprising:
   a memory that stores a plurality of address data relating to the remote device, each of the plurality of the address data being one of a first type of address data and a second type of address data, the first type of address data having a first type of address for identifying the remote device by a first communication method, and first data information indicating the first communication method, and the second type of address data having a second type of address for identifying the remote device by a second communication method, and second data information indicating the second communication method;
   a retrieving unit that retrieves one of the plurality of address data from the memory based on a remote-device indication information;
   a determination unit that determines based on the data information of the retrieved address data whether the retrieved address data is the first type or the second type;
   a first communication unit that communicates with the remote device based on the first type of address by the first communication method if the determination unit determines that the retrieved address data is the first type;
   a second communication unit that communicates with the remote device based on the second type of address by the second communication method if the determination unit determines that the retrieved address data is the second type; and
   a data editing unit that communicates with the address management device, based on SNMP-based communication, the data editing unit comprising:
      a first receiving unit that receives a read command transmitted from the address management device, the read command indicating that the address management device plans to edit at least one of the plurality of the address data;
      a reading unit that reads corresponding address data from the memory in response to the read command;
      a transmitting unit that transmits the read address data to the address management device, the read address data including at least one of the first and second types of address and corresponding data information;
      a second receiving unit that receives the address data edited by the address management device and a register command transmitted from the address management device, the edited address data including the edited at least one of the first and second types of address and the corresponding data information; and
      a data registration unit that registers the received address data by the second receiving unit into the memory in response to the register command.

2. The communication device according to claim 1, wherein the second communication unit transmits communication data to the remote device over a public telephone network via a facsimile transmission, and the second type of address data includes facsimile numbers of the remote device.

3. The communication device according to claim 1, wherein the first communication unit transmits communication data as an e-mail message to the remote device over Internet, and the first type of address data includes e-mail addresses of the remote device.

4. The communication device according to claim 1, further comprising a scanner unit that scans images on a document to generate image data, wherein the communication unit transmits the image data as communication data to the remote device.

5. The communication device according to claim 1, wherein the retrieving unit communicates with a terminal through a LAN, and the remote-device indication information is transmitted from the terminal.

6. The communication device according to claim 1, wherein the address data is stored based on SNMP.

7. The communication device according to claim 1, wherein the data editing unit communicates with the address management device through a LAN.

8. A communication system comprising a communication device and an address management device communicating therewith through a LAN, the communication device communicating with a remote device connected to a communication network, wherein
   the communication device comprises:
      a memory that stores a plurality of address data relating to the remote device, each of the plurality of address data being one of a first type of address data and a second type of address data, the first type of address data having a first type of address for identifying the remote device by a first communication method and first data information indicating the first communication method, and the second type of address data having a second type of address for identifying the remote device by a second communication method, and second data information indicating the second communication method;
      a retrieving unit that retrieves one of plurality of address data from the memory;
      a determination unit that determines based on the data information of the retrieved address data whether the retrieved address data is the first type or the second type;
      a first communication unit that communicates with the remote device in accordance with the first type of address by the first communication method if the determination unit determines that the retrieved address data is the first type;
      a second communication unit that communicates with the remote device in accordance with the second type of address by the second communication method if the determination unit determines that the retrieved address data is the second type; and
      a third communication unit that communicates with the address management device based on SNMP-based communication, and
   the address management device comprises:
      an address data retrieving unit that transmits a read command to the communication device when retrieval of the address data is instructed by a user, the read command retrieving the at least one of the plurality of address data from the communication device, at least one of the plurality of address data including at least one of the first and second types of address and corresponding data information;

a display unit that displays the retrieved address data;

a data editing unit that edits the at least one of address included in the retrieved address data based on an instruction from the user; and an address data registration unit that transmits the edited address data and a register command to the communication device, when transmission of the address data is instructed by the user, the edited address data including at least one of the first and second types of address and corresponding data information, and wherein the communication device further comprises:

a data registration unit that registers the edited address data transmitted from the address management device into the memory on receiving the register command.

9. The communication system according to claim 8, wherein the communication device comprises a plurality of communication devices connected to the LAN, the address data registration unit transmits the address data and the register command to two of the plurality of communication devices selected by the user, the address data transmitted by the address data registration unit being identical to each other.

10. The communication device according to claim 1, wherein if the second receiving unit receives the register command without the address data to be registered from the address management device, the data editing unit deletes all address data stored in the memory.

11. The communication device according to claim 1, wherein each of the plurality of address data is associated with an index number and stored therewith in the memory, the index number corresponds to either one of the first type of address data and the second type of address data, and reading the address data from the memory and registering the address data into the memory is performed based on the index number.

* * * * *